United States Patent [19]

Couturier

[11] 4,433,438
[45] Feb. 21, 1984

[54] SOBEL EDGE EXTRACTION CIRCUIT FOR IMAGE PROCESSING

[75] Inventor: Guy D. Couturier, Beavercreek, Ohio

[73] Assignee: The United States of America as represented by the Secretary of the Air Force, Washington, D.C.

[21] Appl. No.: 324,914

[22] Filed: Nov. 25, 1981

[51] Int. Cl.³ .......................... G06K 9/64; H04N 5/14
[52] U.S. Cl. ....................................... 382/41; 382/22; 382/54; 358/166
[58] Field of Search ...................... 382/41, 22, 21, 43, 382/54, 55, 6; 364/752, 814, 807, 826, 729, 725, 715, 718, 736, 414; 358/166, 96

[56] References Cited

U.S. PATENT DOCUMENTS

| | | | |
|---|---|---|---|
| 3,049,296 | 8/1962 | Hertz et al. | 364/752 |
| 3,226,532 | 12/1965 | Gordon et al. | 235/164 |
| 3,280,314 | 10/1966 | Weigler | 364/752 |
| 3,576,983 | 5/1971 | Cochran | 364/752 |
| 3,906,210 | 9/1975 | Mignot | 364/752 |

OTHER PUBLICATIONS

"Digital Image Processing", by W. K. Pratt, pp. 487–492.
"Sobel Edge Extraction Circuit", by Guy D. Couturier, Air Force Wright Aeronautical Laboratories, Wright-Patterson Air Force Base, Ohio.

*Primary Examiner*—John C. Martin
*Assistant Examiner*—Michael D. Parker
*Attorney, Agent, or Firm*—Donald J. Singer; Bernard E. Franz

[57] ABSTRACT

The Sobel square root algorithm $S=\{[(a+2b+c)-(g+2f+e)]^2+[(a+2H+g)-(c+2d+e)]^2\}^{\frac{1}{2}}$, with 8-bit input data from a 3×3 window and 6-bit output is performed on a single VLSI chip, using a square table only 128×13 and a square root table only 1027 or 1032×6 in ROM. The random logic including adders and clock circuits are also on the same chip with the ROM tables.

7 Claims, 4 Drawing Figures

SOBEL EDGE EXTRACTION CIRCUIT FOR IMAGE PROCESSING

RIGHTS OF THE GOVERNMENT

The invention described herein may be manufactured and used by or for the Government of the United States for all governmental purposes without the payment of any royalty.

BACKGROUND OF THE INVENTION

This invention relates to the art of image processing, with electronic circuits for edge extraction/enhancement using the Sobel algorithm to improve the picture quality.

Rapid advances have been made during the past several years in large-scale integrated circuit technology. These advances have had a significant impact on many signal processing functions for advanced reconnaissance and weapon delivery systems. These systems use photographic or video images to survey an area to detect enemy vehicles/targets, identify them and cue them as to priority as a strike objective (for example: a tank vs. a jeep or a missile site vs. a truck).

One approach taken to solve this detection and identification problem is to first perform an edge extraction/enhancement on a video or video equivalent (i.e., infrared, forward looking infrared, laser scan, etc.) signal. This involves scanning the image to form pixels, and then converting the pixel values to digital form, commonly with an eight-bit data word for each pixel. The edges in these images can be used in a number of various ways. They can be used for pattern matching or fed into a subsystem for further processing.

However, any subsequent subsystem is dependent on the quality of the edges found. There are a number of algorithms for analyzing images from photographs or video frames, in which individual pixels are first converted to digital form. Many of these algorithms use a 3×3 window of pixels in each step of processing. Investigations have shown that the Sobel square root algorithm is the best 3×3 window algorithm studied to date.

While this and other algorithms can be executed easily at low data rates using general purpose minicomputers or even commercial microprocessors, it is usually not possible to execute them in real time in an airborne environment because of excessive size, weight, power dissipation, and cost. The key to effective system design is to apply large scale integrated circuit technology (LSIC) to minimize the overall component count and variety of components while absorbing as much as possible of the control and timing logic onto the information processing chips themselves. However, the complexity of the Sobel square root algorithm has precluded its use in real-time or near real-time systems.

A simplified form is the Sobel magnitude algorithm, (Equation (1) which is $$S = |(a + 2b + c) - (g + 2f + e)| + |(a + 2h + g) - (c + 2d + e)| \quad (1)$$

where

| a | b | c | |
|---|---|---|---|
| h | z | d | represents the 3 × 3 window. |
| g | f | e | |

In one case analog charge coupled devices (CCD's) were used with the above algorithm that operated at 4 MHZ but yielded only a four-bit output. In another a number of 68000 microprocessors are used in parallel to achieve near real-time speeds.

A large number of image processing algorithms have been evaluated. This work was mainly looking into bandwidth reduction, edge enhancement and edge detection, with recent effort concentrating on edge detection. The purpose of these studies was to determine which of the algorithms could be implemented on a single monolithic integrated circuit. Though a single chip was the major goal, the quality and accuracy of the algorithm was also a major factor in the determination of its applicability. The Sobel square root algorithm most nearly met both of the above criteria, this algorithm (Equation 2) is $$S = \{[(a+2b+c)-(g+2f+e)]^2 + [(a+2h+g)-(c+2d+e)]^2\}^{\frac{1}{2}} \quad (2)$$

In order to solve the Sobel square root algorithm one usually first solves the absolute magnitude portion of the Sobel magnitude equation. Before summing the absolute values each value is squared. The summation is then followed by a square root operation. These additional steps increase the hardware complexity of the Sobel tremendously, however, it provides the best linear response between actual and detected edge orientation.

SUMMARY OF THE INVENTION

The object of the invention is to reduce the hardware complexity of a circuit to execute the Sobel square root algorithm, preferably to a single integrated circuit chip.

The circuit according to the invention uses reduced look-up tables in memory for the square and square root functions, while obtaining excellent results for image evaluation.

DETAILED DESCRIPTION

A single integrated circuit chip according to the invention implements the Sobel square root algorithm in real-time with a six-bit output. It is described in my paper "Sobel Edge Extraction Circuit" in the IEEE NAECON proceedings, May 21, 1981, which is hereby incorporated by reference. The device is useful as a preprocessor for target cueing or target classification systems, or as a preprocessor for map matching or pattern recognition systems.

What has caused the major problem in implementing the Sobel square root in the past is the need to perform two squares followed by the square root of their sums. One of the ways to achieve real-time operation would be to use high speed multipliers and two custom chips (or gate arrays) to perform the input/output, additions, subtractions and the square root. This method would require a total of three or four chips with the high speed multipliers consuming a large amount of power.

A second way to implement both the squares and the square root is to use memories as look-up tables. If these tables are of reasonable size, they could be put on the same chip as the random logic. The logic for data input and determining the two absolute values $|(a+2b+c)-(g+2f+e)|$ and $|(a+2h+g)-(c+2d+e)|$ requires a relatively simple set of latches and adders. With eight-bit input data, the resulting absolute values have ten bits. The memory tables then require $1K \times 20$ bits to do the squares and $2M \times 11$ bits to do the square root. As can be seen the size of the square root table alone is well beyond the state-of-the-art. Therefore the memories would need to be off chip, in which case memory systems with access times of 130 nanoseconds or less are required. To achieve these access speeds an excessive number of existing memory circuits would be necessary to implement the tables. In addition these circuits operating at the required speed would dissipate an undesirable amount of power.

Figure 1:
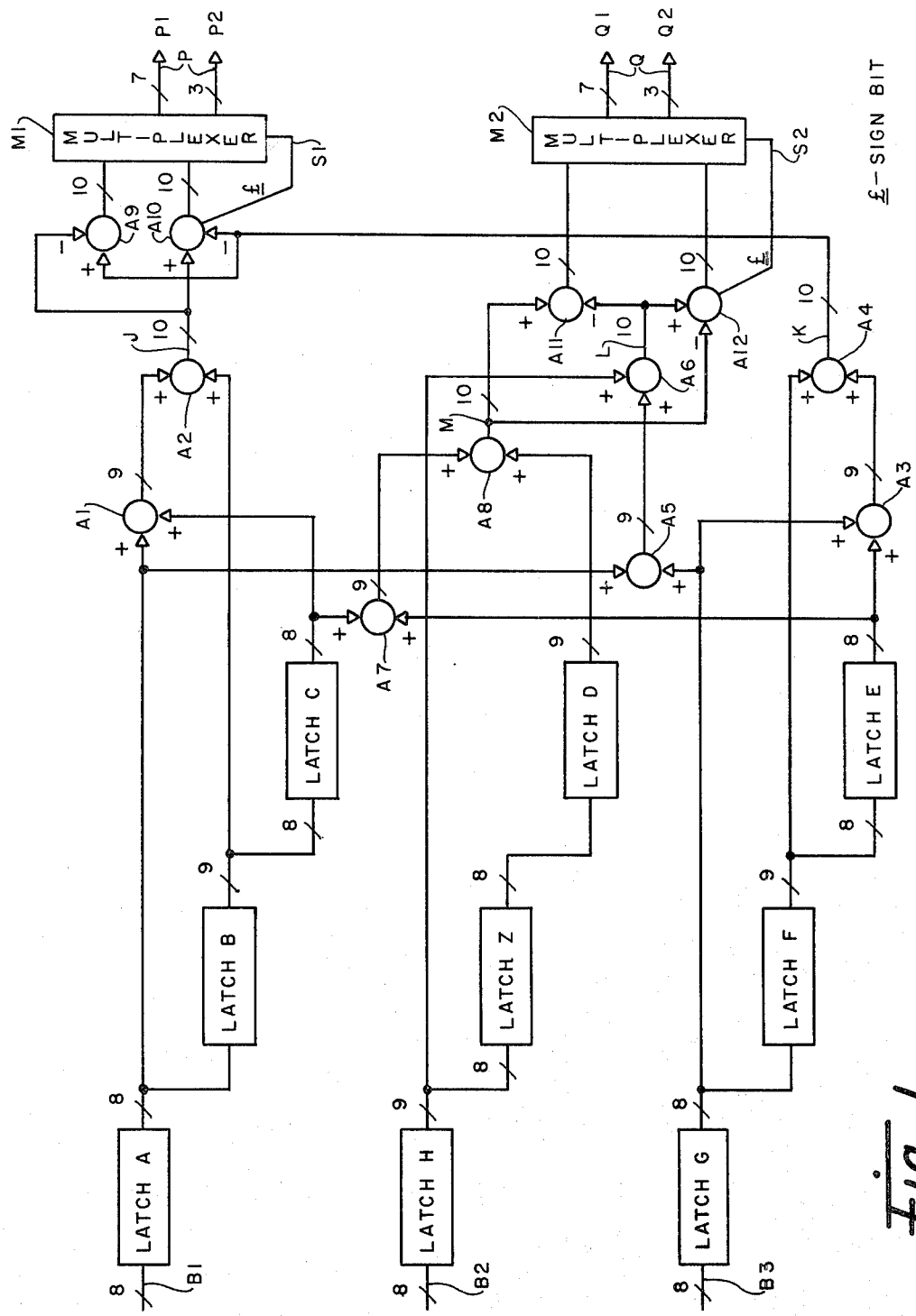
FIGS. 1 and 2 comprise a functional block diagram of a device for solving the Sobel square root algorithm.
Figure 2:
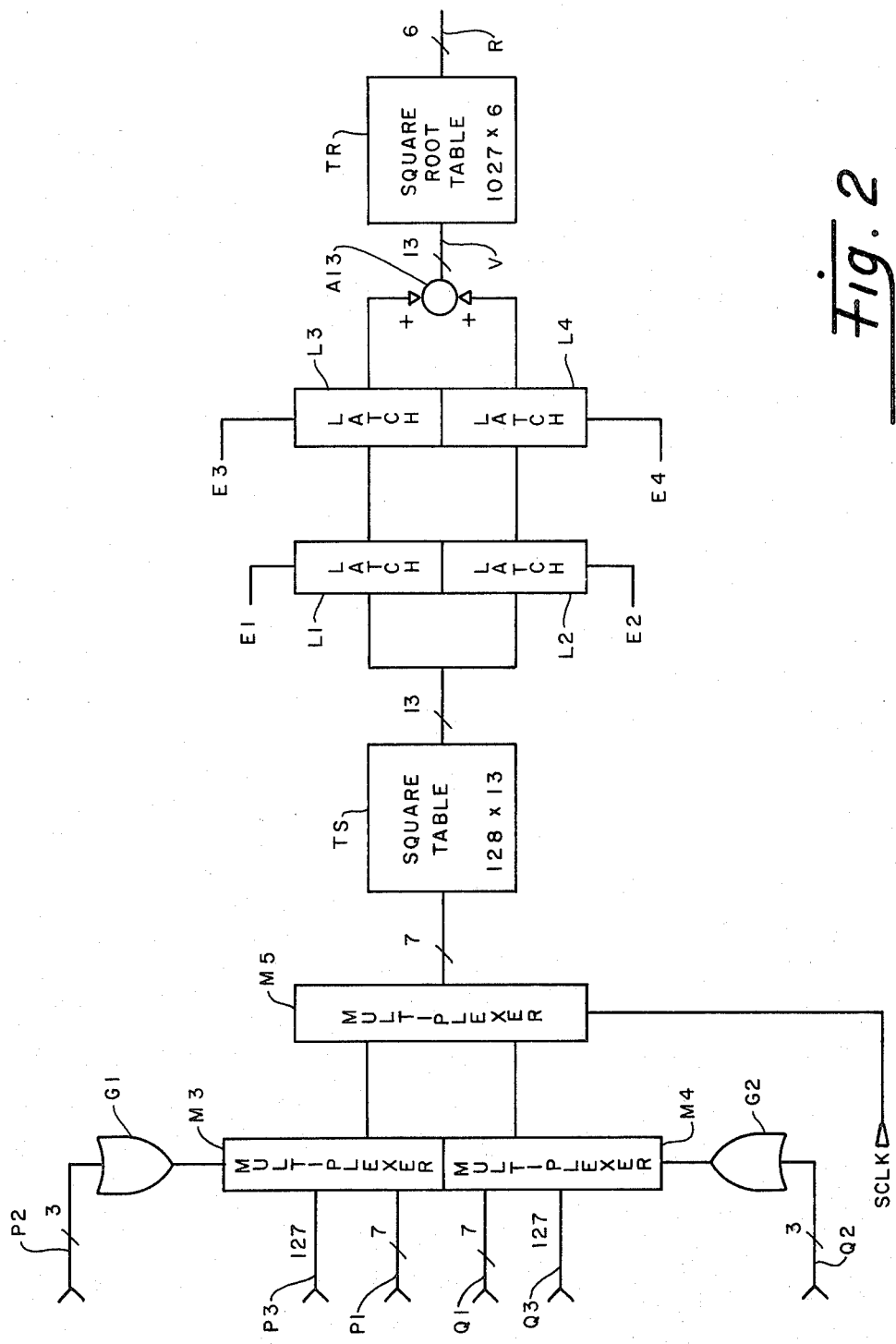

FIGS. 1 and 2 comprise a block diagram of a pipelined architecture for the Sobel edge extraction circuit according to the invention. All input and interconnecting buses have parallel conductors as indicated by a number adjacent a diagonal line across the line representing the bus. Data enters the circuit via three 8-bit buses B1, B2, B3 and are latched into a $3 \times 3$ latch matrix. By clocking in data for latches C, D, and E first, followed by data for latches B, Z, and F, then finally clocking in data for latches A, H, and G, a sliding window can be entered. An internal high speed three-phase clock (not shown) can accomplish this if less than a 30% duty cycle clock is used.

The first eight adders A1-A8 perform the additions inside the inner brackets of Equation 2, while the remaining four adders A9-A12 perform the subtractions. The multiplication by two is accomplished by shifting the data from the latches B, D, F, and H left one bit at the inputs of adders A2, A8, A4 and A6 respectively. This effectively increases the data to nine bits at these inputs, and the adder outputs have ten bits. Thus, the output from adder A2 is $J=(a+2b+c)$, from adder A4 is $K=(g+2f+e)$, from adder A6 is $L=(a+2h+g)$, and from adder A8 is $M=(c+2d+e)$.

To maintain a pipelined architecture, the subtraction is performed in both directions, and a multiplexer in combination with one of the sign bits is used to pass the positive result. Thus, the outputs of adders A9 and A10 are $(K-J)$ and $(J-K)$, and the sign bit on lead S1 controls the multiplexer M1 to pass the positive result to bus P. Likewise the outputs of adders A11 and A12 are $(M-L)$ and $(L-M)$, and the sign bit on lead S2 controls the multiplexer M2 to pass the positive result to bus Q. An absolute magnitude circuit could replace the dual subtractor.

Referring to FIG. 2, the square table TS is reduced by passing only seven of the ten bits from the subtraction circuitry. Less than 0.2% of the values studied at this point were above 127 (seven bits). To maintain the accuracy, the three MSB's (most significant bits) are OR'ed together. If any of the three bits are high (value of one), the value 127 is passed to the square table TS. If all three are low, the seven LSB's (least significant bits) are passed. Thus, the bus P from multiplexer M1 is divided with the seven LSB's on a group P1 connected as an input of multiplexer M3, and the three MSB's on a group P2 via OR gate G1 controls the multiplexer selection. The other multiplexer input P3 has seven leads biased to be always all one's, which is a decimal value 127. If the output of gate G1 is high, input P3 is selected, otherwise input P1. In like manner the bus Q from multiplexer M2 is divided into groups Q1 and Q2 for the seven LSB's and three MSB's respectively. The three bits on bus Q2 via OR gate G2 control multiplexer M4 to select either input from bus Q1 or the value 127 at input Q3.

The square table TS has only 128 words of 13 bits each (the LSB of the 14-bit value which results from squaring a 7-bit value can be dropped and picked up later in the square root table). The full accuracy of the Sobel computation is maintained up to the square table, to insure the highest accuracy possible.

The input data could even have more bits per word with full accuracy maintained for the computation up to the square table. It is assumed that for a natural picture (i.e., not a test pattern) the differences between neighboring pixels will not be significantly greater when using eight or even twelve bit data instead of six. The seven LSB's would be used to address the memory table, reducing any higher values to 127.

The multiplexer M5 controlled by a signal on lead SCLK from the system clock (not shown) feeds the results from the two sets of subtractors via multiplexers M3 and M4 into the square table TS one at a time. The squared results from the table are then stored in latches L1 and L2 respectively, controlled by clock signals on leads E1 and E2. (Two square tables could be used and would thus eliminate one multiplexer and two latches, though the memory table would take up a larger area than that which it would replace. However, this would make the device fully parallel.)

The two squared results are then passed from latches L1 and L2 into latches L3 and L4 respectively under control of clock signals on leads E3 and E4, and are added together in adder A13. The result on bus V is the address for the square root table TR.

By reducing the square table the square root table was reduced down to a memory size of $16K \times 8$. Although significantly reduced it is still beyond the state of the art.

Investigation of the Sobel algorithm showed that the weights are either in the horizontal or the vertical direction, therefore, the chances of a set of pixel values (in the $3 \times 3$ window) resulting in a maximum change in both directions is exceedingly high. Whenever one square calculation is near the maximum value, the other will be near zero or significantly smaller than the other and can be assumed to be insignificant. This reduces the square root table to $8K \times 7$, which is still too large to go on the same chip with the other memory and the random logic. A printout of the values used within the square root table showed that less than 0.4% of the values were greater than 4096, less than 2% were greater than 2048, and less than 5.5% were greater than 1024. Therefore, the square root table is reduced to either $1027 \times 6$ (FIG. 3) or two tables (FIG. 4) equivalent to $1032 \times 6$. The $1027 \times 6$ table needs a fair amount of additional random logic and is not as accurate as the two table version.

Figure 3:
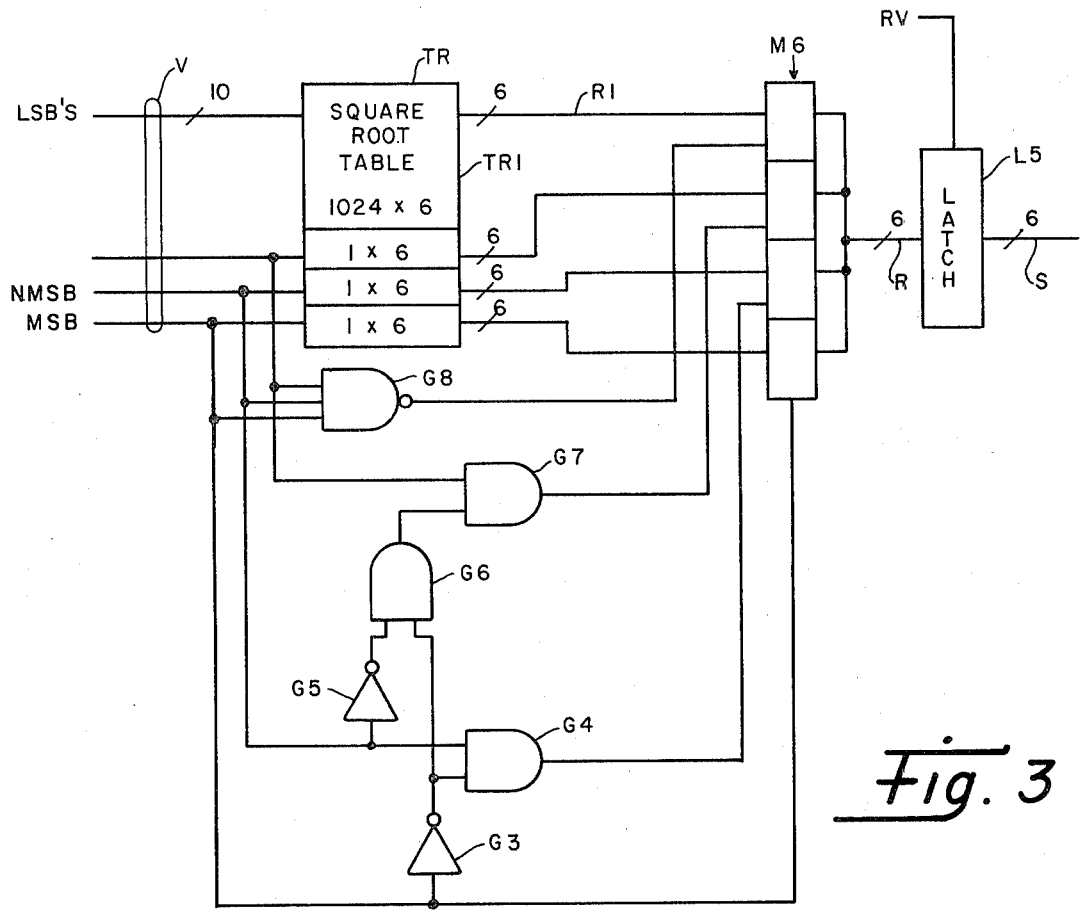
FIGS. 3 and 4 are functional block diagrams of alternative embodiments for the square root tables.
Figure 4:
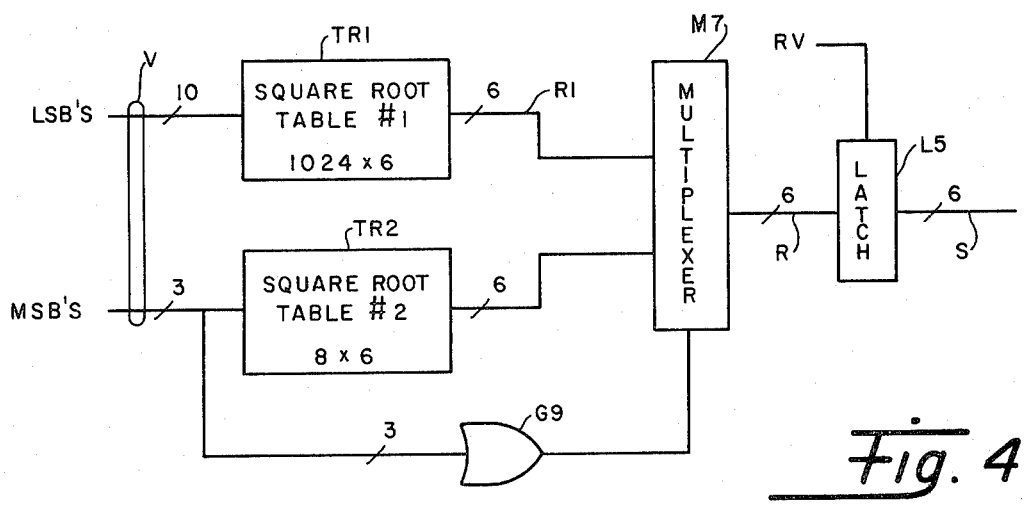

In both FIGS. 3 and 4 there is a subtable TR1 of 1024 words of 6 bits each, with the input address on the 10 LSB's of bus V, and the output on a 6-bit bus R1.

In FIG. 3, the square root table has three additional words, each addressed by one of the three MSB's of bus V. If the MSB is high the word shown at the bottom of the table is addressed, and the lower section of multiplexer M6 is enabled to pass a value for the square root of 4096 to the 6-bit bus R. The outputs of gates G4, G7 and G8 are all low so that no other sections of the multiplexer are enabled.

If the MSB is low and the next MSB is high, the second from the bottom word of table TR is addressed, and the gate G4 output is high to enable the multiplexer M6 to pass a value equal to the square root of 2048 to bus R. If the two MSB's are low and the third is high, the third from the bottom word of table TR is addressed, and the gate G7 output is high to enable the multiplexer to pass a value equal to the square root of 1024 to bus R. If the three MSB's are all low, the output of NAND gate G8 is high to enable the multiplexer M6 to pass a value from table TR1 as addressed by the ten LSB's. During the portion of the clock cycle when the result is valid, a clock signal on lead RV enables latch L5 to store the square root value from bus R. The output of latch L5 is the value S on bus S.

In FIG. 4, dual square root tables TR1 and TR2 with 1024 words and eight words respectively, each word having six bits. Table TR1 has the ten LSB's from bus V as its input, while table TR2 has the three MSB's. Both results are fed into a multiplexer M7, controlled by an OR gate G9. If any one of the three MSB's is high, the output of gate G9 is high to select the result from table TR2. If all three MSB's are low, the result from table TR1 is selected. The result is stored in latch L5 when enabled by the clock signal on lead RV, as in FIG. 3, to provide the output S.

Images evaluated using these tables gave excellent results.

Thus, while preferred constructional features of the invention are embodied in the structure illustrated herein, it is to be understood that changes and variations may be made by the skilled in the art without departing from the spirit and scope of my invention.

I claim:

1. An image processing device on a single integrated circuit chip for performing the Sobel algorithm $S=\{[(a+2b+c)-(g+2f+e)]^2+\{(a+2h+g)-(c+2d+e)\}^2\}^{\frac{1}{2}}$ with digitized input data words derived from an image by use of a 3×3 window in the form

| a | b | c |
|---|---|---|
| h | z | d |
| g | f | e | supplied via input data bus means, said device comprising:

input logic means including input register means and parallel adder means for performing the functions $J=(a+2b+c)$, $K=(g+2f+e)$, $L=(a+2h+g)$, $M=(c+2d+e)$, $P=|J-K|$ and $Q=|L-M|$ which produces words P and Q, the input register means being coupled to said input data bus means;

first memory means storing binary words representing the squares of the binary numbers 0 to 111 1111 with 13 bits per word for the squares using 7-bit addresses, first selection means for selecting the seven least significant bits of each of said words P and Q if the remaining more significant bits are all zero's and otherwise selecting the binary number 111 1111 as addresses to produce memory outputs from said first memory means for $P^2$ and $Q^2$, register means coupled to the first memory means output and adder means coupled thereto to provide a 13-bit word for the value $V=(P^2+Q^2)$;

second memory means storing binary words of six bits each representing the square root of V, comprising a first memory section of 1024 words with addresses formed from the ten least significant bits of V, and a second memory section with addresses formed from the three most significant bits of V, with second selection means for selecting an output from said first section if the three most significant bits are all zero's and otherwise to select an output from said second section, and means to supply the selected output as the Sobel square root value S.

2. A device according to claim 1, wherein said first memory means comprises a read only memory for only one table of 128 words of 13 bits each, wherein said first selection means comprises two multiplexers, one for word P and one for word Q, each having one input for the seven least significant bits, another input for the fixed value 111 1111, and a control input from an OR gate having the said more significant bits as inputs, another multiplexer having inputs from said two multiplexers, and a clock input for selecting the two inputs in sequence, the output being connected for addressing said first memory means so that said one table is used for squaring both words P and Q sequentially, said register means coupled to the first memory output being comprised of latches which are clocked to be loaded sequentially with words $P^2$ and $Q^2$ in synchronization with the input clocking of said another multiplexer.

3. A device according to claim 1 or 2, wherein in said second memory means, said second memory section comprises an eight-word by six-bit memory, and said second selection means is a multiplexer having two inputs connected respectively to the outputs of said first memory section and said second memory section, with a control input from an OR gate having the three most significant bits as inputs.

4. A device according to claim 3, wherein said input data bus means comprises three buses each having parallel conductors for eight bits, wherein in said input logic means said input register means comprises three latches designated A, H and G connected respectively to the three buses, three latches designated B, Z and F connected respectively to outputs of latches A, H and G, and three latches designated C, D and E connected respectively to outputs of latches B, Z and F, the outputs of latches A, B, C, D, E, F, G and H being connected to the adder means to perform the operations $J=(a+2b+c)$, $K=(g+2f+e)$, $L=(a+2h+g)$ and $M=(c+2d+e)$, the multiplications by two being accomplished by the connections being made so that the data is shifted left one bit;

and wherein in said input logic means the apparatus for performing the operation $P=|J-K|$ comprises one adder connected to subtract K from J, another adder connected to subtract J from K, and a multiplexer with a control input from the sign bit of one of these two adders and data inputs from the other bits of both adders to select the positive result; the apparatus for performing the operation $Q=|L-M|$ similarly comprising two adders and a multiplexer connected in the same manner, P and Q being each produced on buses for 10 bits.

5. A signal processing device comprising:

input logic means which during each of a sequence of time intervals produces two parallel digital data words P and Q, each having a given number of bits greater than N;

first memory means storing binary words representing the squares of the $2^N$ binary numbers 0 to $(2^N-1)$ with at least $(2N-1)$ bits per word for the squares using addresses of N bits, first selection means for selecting the N least significant bits of each of said words P and Q if the remaining more significant bits are all zero's and otherwise selecting the binary number $(2^N-1)$ as addresses to produce memory outputs from said first memory means for $P^2$ and $Q^2$, register means coupled to the first memory means output and adder means coupled thereto to provide a word having at least $(2N-1)$ bits for the value $V=(P^2+Q^2)$;

second memory means storing binary words representing the square root of V of approximately half the number of bits as words in the first memory means, the second memory means being comprised of first and second sections, the first section having addresses formed from a predetermined number of the least significant bits of words V, and the second section having addresses formed from the remaining more significant bits of V, with second selection means for selecting an output from said first section if said remaining more significant bits of V are all zero's and otherwise to select an output from said second section, and means to supply the selected output as the output of said device representing $\sqrt{P^2+Q^2}$ during each of said time intervals.

6. A device according to claim 5, wherein N equals seven.

7. A device according to claim 5 or 6, for processing the Sobel algorithm $S=\{[(a+2b+c)-(g+2f+e)]^2+[(a+2h+g)-(c+2d+e)]^2\}^{\frac{1}{2}}$, the input logic means comprising register means and arithmetic means to form $P=[(a+2b+c)-(g+2f+e)]$, and $Q=[(a+2h+g)-(c+2d+e)]$.

* * * * *